(12) United States Patent
Washizu et al.

(10) Patent No.: US 12,494,113 B2
(45) Date of Patent: Dec. 9, 2025

(54) DISASTER PREVENTION APPARATUS TO DETECT FIRE OUTBREAK OR GAS LEAKAGE

(71) Applicant: HOCHIKI Corporation, Tokyo (JP)

(72) Inventors: Keisuke Washizu, Tokyo (JP); Manabu Dohi, Tokyo (JP)

(73) Assignee: HOCHIKI Corporation, Tokyo (JP)

( * ) Notice: Subject to any disclaimer, the term of this patent is extended or adjusted under 35 U.S.C. 154(b) by 0 days.

(21) Appl. No.: 18/118,892

(22) Filed: Mar. 8, 2023

(65) Prior Publication Data

US 2023/0237885 A1  Jul. 27, 2023

Related U.S. Application Data

(63) Continuation-in-part of application No. PCT/JP2020/040836, filed on Oct. 30, 2020.

(51) Int. Cl.
*G08B 5/36* (2006.01)
*F21V 8/00* (2006.01)
*G08B 21/02* (2006.01)

(52) U.S. Cl.
CPC ............. *G08B 5/36* (2013.01); *G02B 6/0088* (2013.01); *G08B 21/02* (2013.01)

(58) Field of Classification Search
CPC ...... G02B 6/0088; G08B 17/06; G08B 17/10; G08B 17/113; G08B 21/02; G08B 5/36
See application file for complete search history.

(56) References Cited

U.S. PATENT DOCUMENTS 5,291,193 A * 3/1994 Isobe ............... G08B 25/10
340/12.3
6,300,876 B1 * 10/2001 Sakurai .............. G08B 17/00
340/630

(Continued)

FOREIGN PATENT DOCUMENTS

EP  1049061 A2  11/2000
EP  3866130 A1   8/2021

(Continued)

OTHER PUBLICATIONS

International Search Report & Written Opinion of PCT/JP2020/040836 dated Dec. 8, 2020, all pages cited in its entirety.

(Continued)

*Primary Examiner* — Omer S Khan
(74) *Attorney, Agent, or Firm* — Burr & Forman (57) ABSTRACT

A detector 100 includes an outer cover 11; and a light emitter that outputs information by causing at least a part of the detector 100 to emit light, wherein the light emitter causes at least a protective portion 12 to emit the light, the protective portion 12 accommodating a thermistor that detects a physical quantity of a detection target, and protruding from the outer cover 11, the protective portion 12 guides the light from the light emitter, and emits the light, the detector 100 further includes a light guide portion 111 formed in at least a part of the outer cover 11, and the light emitter causes the light guide portion 111 to emit the light, and a light emitting surface of the light guide portion 111 extends from a front portion side of the outer cover 11 to a side portion side of the outer cover 11, and the light emitting surface of the light guide portion 111 has a linear shape when viewed from the front portion side of the outer cover 11.

6 Claims, 6 Drawing Sheets

(56) References Cited

U.S. PATENT DOCUMENTS

| | | | |
|---|---|---|---|
| 2003/0058117 A1 | 3/2003 | Kari et al. | |
| 2009/0243835 A1* | 10/2009 | Katou | G08B 29/183 |
| | | | 340/521 |
| 2014/0268632 A1* | 9/2014 | Yang | F21S 6/002 |
| | | | 362/235 |
| 2016/0305874 A1 | 10/2016 | Iguchi et al. | |
| 2019/0113387 A1* | 4/2019 | Lee | G01J 3/42 |
| 2021/0046346 A1* | 2/2021 | Fujiwara | G01J 5/0014 |

FOREIGN PATENT DOCUMENTS

| | | |
|---|---|---|
| JP | H02257399 A | 10/1990 |
| JP | 0440396 U1 | 4/1992 |
| JP | 2003036488 A | 2/2003 |
| JP | 2006215865 A | 8/2006 |
| JP | 1332979 | 6/2008 |
| JP | 2011248547 A | 12/2011 |
| JP | 2012198757 A | 10/2012 |
| JP | 2018206217 A | 12/2018 |

OTHER PUBLICATIONS

Supplementary European Search Report issued in corresponding European Patent Application No. 20959863 mailed Jun. 26, 2024, all pages cited in its entirety.

Written Opinion issued in corresponding European Patent Application No. 20959863 mailed Jun. 26, 2024, all pages cited in its entirety.

Communication pursuant to Article 94(3) EPC from corresponding EP Application No. 20959863.0, mailed Apr. 10, 2025, all pages cited in its entirety.

First Office Action from corresponding Chinese Application No. 202080106479.0, mailed Sep. 18, 2025, all pages cited in its entirety.

* cited by examiner

DISASTER PREVENTION APPARATUS TO DETECT FIRE OUTBREAK OR GAS LEAKAGE

CROSS REFERENCE TO RELATED APPLICATIONS

The present application claims the benefit of the PCT application No. PCT/JP2020/040836 filed on Oct. 30, 2020, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a disaster prevention apparatus.

BACKGROUND ART

In the related art, a detector that is installed on a ceiling, etc. to detect heat caused by fire has been known (for example, refer to Patent Literature 1). In the detector, a state of the detector or a monitoring region is notified by causing an indicator light to emit light, the indicator light being provided on an outer cover.

CITATION LIST

Patent Literature

Patent Literature 1: Laid-Open Patent Publication in Japan No. 2012-198757

SUMMARY OF INVENTION

Technical Problem

However, since the indicator light of the detector of Patent Literature 1 is provided next to a protector (for example, a portion that protects a thermistor) protruding from the outer cover, there is a possibility that the protector blocks the field of vision depending on a direction in which the detector is viewed. Therefore, it is necessary to strictly manage an installation direction of the detector based on predetermined criteria (for example, the standard that the detector is installed such that the indicator light of the detector is visible from an entrance of a room in which the detector is installed), which is troublesome work.

It is an object of the present invention to solve the problems of the above mentioned prior arts.

Solution to Problem

One aspect of the present invention provides a disaster prevention apparatus comprises: an outer cover; and a light emitter that outputs information by causing at least a part of the disaster prevention apparatus to emit light, wherein the light emitter causes at least a detection element protector to emit the light, the detection element protector accommodating a detection element that detects a physical quantity of a detection target, and protruding from the outer cover.

Another aspect of the present invention provides a disaster prevention apparatus comprises: an outer cover; and a light emitter that outputs information by causing at least a part of the disaster prevention apparatus to emit light, wherein the light emitter causes at least a light guide to emit the light, the light guide being formed in at least a part of the outer cover, and a light emitting surface of the light guide extends from a front portion side of the outer cover to a side portion side of the outer cover.

The other aspect of the present invention provides a disaster prevention apparatus comprises: an outer cover; and a light emitter that outputs information by causing at least a part of the disaster prevention apparatus to emit light, wherein the light emitter causes at least a thin portion to emit the light, the thin portion being a portion thinner than other portions of the outer cover, and a light emitting surface of the thin portion extends from a front portion side of the outer cover to a side portion side of the outer cover.

DESCRIPTION OF EMBODIMENTS

Hereinafter, embodiments of a disaster prevention apparatus according to the invention will be described in detail with reference to the drawings. Incidentally, the invention is not limited by the embodiments.

Basic Concept of Embodiments

First, the basic concept of the embodiments will be described. The embodiments generally relate to the disaster prevention apparatus.

The "disaster prevention apparatus" is an apparatus used for prevention of a disaster, for example, is a concept including an apparatus that detects an abnormality of a monitoring region, etc., and as one example, is a concept including a heat detector, a fire detector, a gas detector, a smoke detector, etc. In addition, the "disaster prevention apparatus" includes, for example, an outer cover and a light emitter, and optionally includes a light guide and a thin portion.

The "monitoring region" is a region to be monitored by the disaster prevention apparatus, specifically, is a certain extent of space and, for example, is a concept including a room (for example, a first-floor room A, a first-floor room B, etc.), a corridor, and a stair of a building, etc. In addition, the "abnormality of the monitoring region" indicates that the state of the monitoring region is different from a normal state and, specifically, is a concept including a fire outbreak, a gas leakage, etc.

The "outer cover" covers, for example, at least some of components of the disaster prevention apparatus.

The "light emitter" is a unit that outputs information by causing at least a part of the disaster prevention apparatus to emit light and, for example, is a concept including a unit that causes a detection element protector to emit light, etc., the detection element protector accommodating a detection element that detects a physical quantity of a detection target, and protruding from the cover. In addition, the "light emitter" is, for example, a concept including a unit that causes the light guide to emit light, etc., and is a concept including a unit that causes the thin portion to emit light, etc. Incidentally, for example, an object that the light emitter causes to emit light may be only one of the detection element protector, the light guide, and the thin portion, may be two thereof, or may be all thereof.

The "physical quantity of the detection target" is, for example, a quantity that can be generated or changed due to an abnormality of the monitoring region, and as one example, is a concept including temperature caused by heat, smoke concentration, the concentration of gas such as carbon monoxide gas, etc. The "detection element" is a component that detects a physical quantity of the detection target and, for example, is a concept including a temperature sensor such as a thermistor, a smoke sensor formed of a light emitting diode, a photodiode, etc., a gas sensor, etc.

The "detection element protector" accommodates the detection element, specifically, is a concept including a detection element protector protruding from the outer cover, etc., for example, is a concept including a detection element protector that guides light from the light emitter and for emitting the light, etc., and as one example, is a concept including a thermistor guard that protects a thermistor, etc.

The "light guide" is formed in at least a part of the outer cover, for example, is a concept including a light guide that guides and emits light, etc., is a concept including a configuration in which a light emitting surface of the light guide extends from a front portion side of the cover to a side portion side of the outer cover, etc., is a concept including a configuration in which the light emitting surface of the light guide has a linear shape or a curved shape when viewed from the front portion side of the outer cover, etc., and is a concept including a light guide, etc. that is provided at a position to correspond to an operation hole provided in the outer cover so as to operate the disaster prevention apparatus. Incidentally, "operating the disaster prevention apparatus" is, for example, a concept including the case where a user physically operates the disaster prevention apparatus, etc., and as one example, is a concept including the case where the disaster prevention apparatus is rotated with respect to an attachment portion in a state where a predetermined jig is inserted into the operation hole, etc. In addition, the "light emitting surface of the light guide" is, for example, a concept including a surface of the light guide that is exposed to the outside of the disaster prevention apparatus and that is viewed by a user, etc.

The "thin portion" is a portion of the outer cover that is relatively thin in thickness compared to other portions, for example, is a concept including a portion thin enough to be able to transmit at least some of irradiation light, etc., is a concept including a portion at which a light emitting surface of the thin portion extends from the front portion side of the outer cover to the side portion side of the outer cover, etc., and is a concept including a portion at which the light emitting surface of the thin portion has a linear shape or a curved shape when viewed from the front portion side of the outer cover, etc. Here, the "light emitting surface of the thin portion" is a concept including a portion of the thin portion through which light emitted from a light emitter is transmitted and which is exposed to the outside of the disaster prevention apparatus, namely, a surface region from which a user views the emission of light.

In addition, in each embodiment to be shown below, the case where the "disaster prevention apparatus" is a heat detector will be described, particularly, in a first embodiment, the case where the detection element protector and the light guide emit light will be described, and in a second embodiment, the case where the detection element protector and the thin portion emit light will be described.

SPECIFIC CONTENTS OF EMBODIMENTS

Next, specific contents of the embodiments will be described.

First Embodiment

First, the first embodiment will be described. In this embodiment, the case where the detection element protector and the light guide emit light will be described.
(Configuration—Detector)

Figure 1:
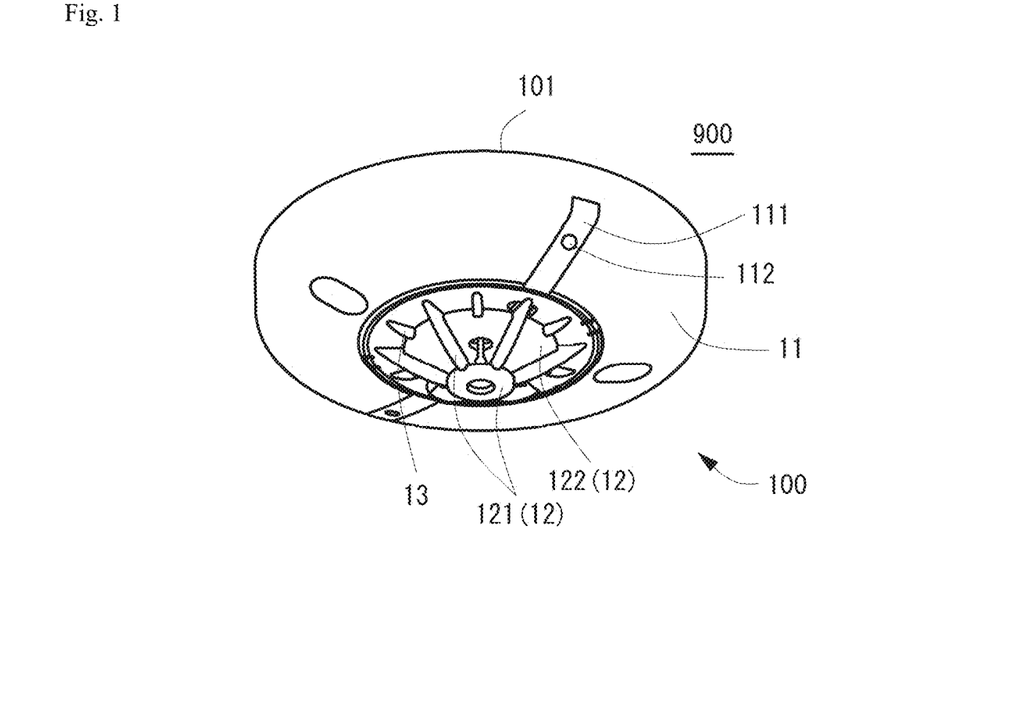
FIG. 1 is a perspective view of a detector according to a first embodiment.
Figure 2:
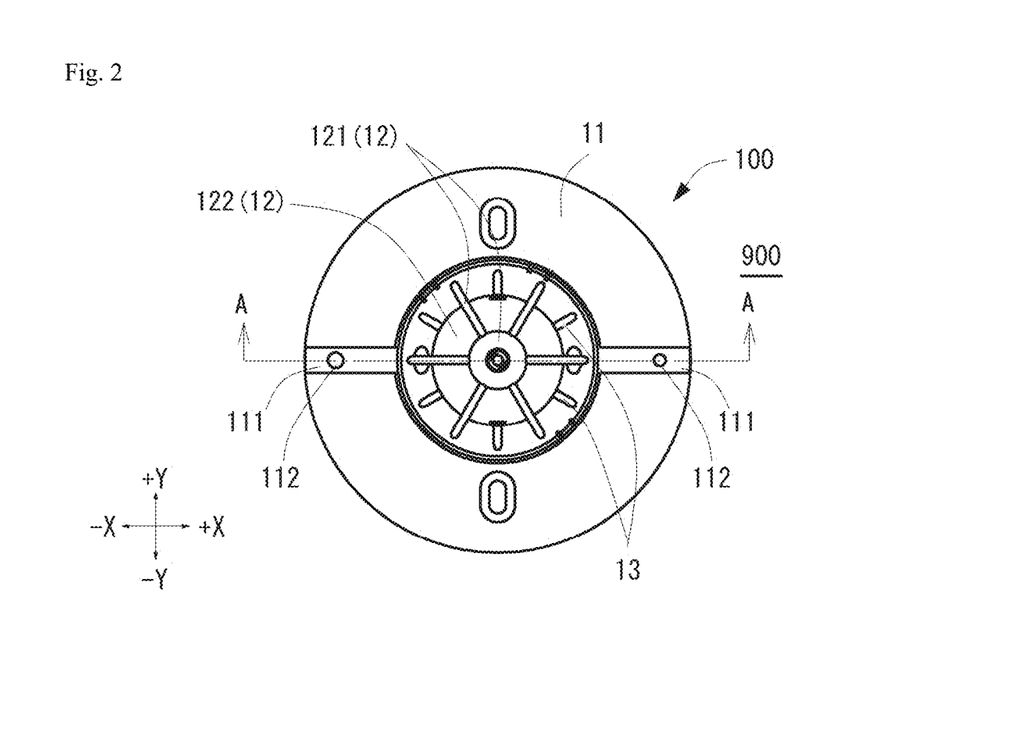
FIG. 2 is a plan view of the detector.
Figure 3:
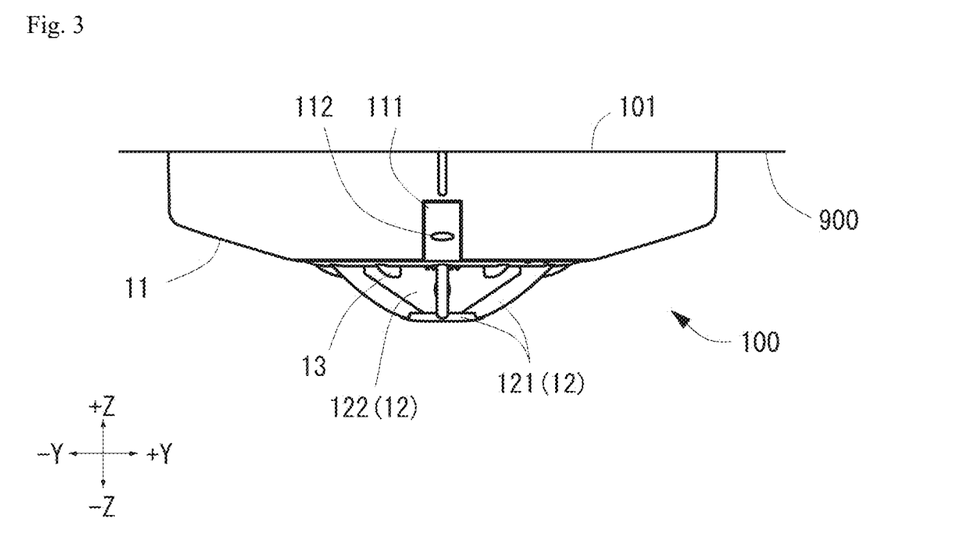
FIG. 3 is a side view of the detector.
Figure 4:
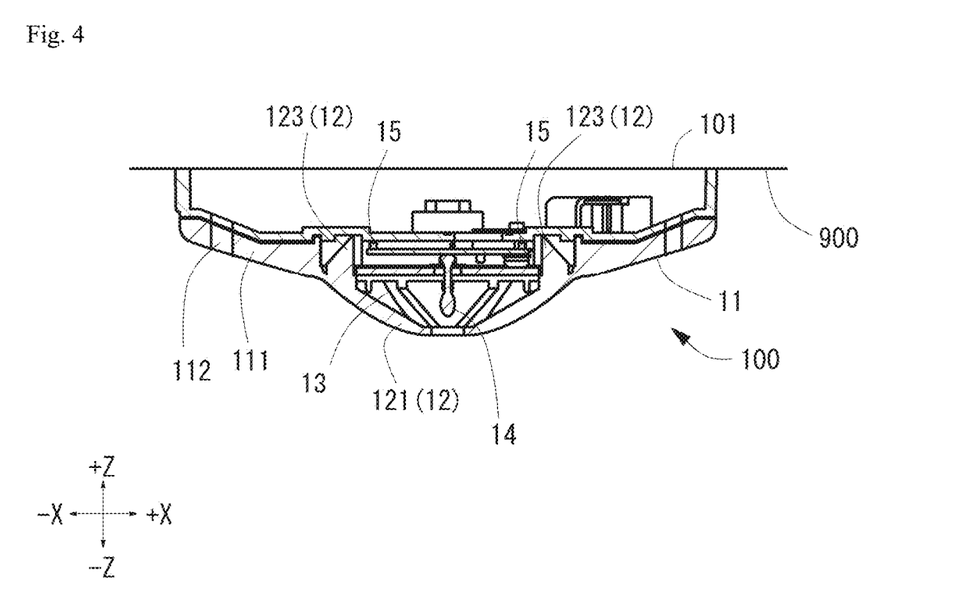
FIG. 4 is a cross-sectional view taken along line A-A of FIG. 2.

First, a configuration of a detector of the present embodiment will be described. FIG. 1 is a perspective view of the detector according to the embodiment of the invention, FIG. 2 is a plan view of the detector, FIG. 3 is a side view of the detector, and FIG. 4 is a cross-sectional view taken along line A-A of FIG. 2. Incidentally, in each drawing, a Z axis, and an X axis and a Y axis orthogonal to the Z axis will be described as indicating a vertical direction and a horizontal direction, respectively. In addition, for example, a "front portion", a "back portion", and a "side portion" will be described as terms referring to parts of a detector 100. Specifically, when the detector 100 is installed on an attachment object 900 that is a ceiling surface, a portion of the detector 100 located on a floor surface side (side opposite the attachment object 900 with respect the detector 100) (−Z direction in FIG. 3) is referred to as the "front portion", and a portion of the detector 100 facing the attachment object 900 that is a ceiling surface (+Z direction in FIG. 3) is referred to as the "back portion". In addition, a peripheral surface of the detector 100 connected to the "front portion" and to the "back portion" is the "side portion". Incidentally, the definitions of the "front portion", the "back portion", and the "side portion" also are the same in the second embodiment.

The detector 1 of each drawing of FIGS. 1 to 4 is a disaster prevention apparatus, specifically, is a heat detector that detects heat, is attached to, for example, the attachment object 900 that is a ceiling surface, through an attachment portion 101 of the detector 100 of FIG. 3 (for example, a so-called "detector base" and a detailed structure is not shown), and as one example, includes an outer cover 11, a protective portion 12, and prevention portions 13 of FIG. 1, and a thermistor 14 and a light emitter 15 of FIG. 4.
(Configuration—Detector—Outer Cover)

The outer cover 11 of FIG. 1 covers at least some of components of the detector 100. A specific type or configuration of the outer cover 11 is any type or any configuration, however, for example, as shown in FIG. 3, the outer cover 11 includes a cylindrical portion of which the diameter is the same even when extending away from the attachment portion 101, and a tapered portion that is reduced in diameter as extending away from the attachment portion 101, has a light-shielding property except for a specified portion, and includes light guide portions 111 and operation holes 112 of FIG. 2. Incidentally, the "light-shielding property" is the ability to block light and, for example, is a concept indicating the ability of the outer cover 11 to prevent light from passing from the inside to the outside.

The light guide portions 111 are the aforementioned light guides. A specific type or configuration of the light guide portions 111 is any type or any configuration, however, for example, the light guide portions 111 is formed in a part of the outer cover 11, are made of any material so as to function as light guides that guide and emit light, are formed separately from portions of the outer cover 11 having a light-shielding property, and allow light to pass through the outer cover 11 from the inside to the outside. In addition, in the light guide portions 111, for example, light emitting surfaces (surfaces exposed to the outside of the detector 100 shown in FIGS. 2 and 3) of the light guide portions 111 extend from a front portion side (−Z direction) of the outer cover 11 to a side portion side (+X direction or −X direction) of the outer cover 11, two light guide portions 111 are provided, as shown in FIG. 2, the light emitting surfaces of the light guide portions 111 have a linear shape when viewed from the front portion side of the outer cover 11, and the light guide portions 111 are provided at positions to correspond to the positions of the operation holes 112.

The operation holes 112 are the aforementioned operation holes. A specific type or configuration of the operation holes 112 is any type or any configuration, however, the operation holes 112 are, for example, holes that communicate with the inside of the outer cover 11 such that the aforementioned predetermined jig can be inserted therethrough.

(Configuration—Detector—Protective Portion)

The protective portion 12 of FIG. 1 is the aforementioned detection element protector. A specific type or configuration of the protective portion 12 is any type or any configuration, however, for example, the protective portion 12 is formed in a part of the outer cover 11, is made of any material so as to function as a light guide that guides and emits light, is formed separately from the portions of the outer cover 11 having a light-shielding property, and allows light to pass through the outer cover 11 from the inside to the outside. In addition, the protective portion 12 protects, for example, the thermistor 14 of FIG. 4, has a hollow portion for accommodating the thermistor 14, protrudes from the outer cover 11 toward a side opposite the attachment portion 101 (−Z direction), is provided at a center of the outer cover 11 in a direction in which the outer cover 11 is widened (direction parallel to an X-Y plane), and is integrally formed with the light guide portions 111. In addition, the protective portion 12 includes, for example, a frame portion 121 and opening portions 122 of FIG. 1, and a spectroscopic portion 123 of FIG. 4.

The frame portion 121 is, for example, a portion forming an outer shape of at least a part of the protective portion 12, and is a portion including one circular member forming a tip portion (−Z direction) of the detector 100, and six support members between the circular member and the outer cover 11, the support members supporting the circular member.

The opening portions 122 are, for example, portions through which a hot air current flows in and out with respect to the thermistor 14 provided in the hollow portion of the protective portion 12, and six opening portions 122 are provided in such a manner to be partitioned off by the aforementioned six support members of the frame portion 121.

The spectroscopic portion 123 is, for example, a portion that refracts, disperses, or reflects light output from the light emitter 15, and is a portion facing the light emitter 15.

(Configuration—Detector—Prevention Portion)

The prevention portions 13 of FIG. 1 are preventors that prevent a contact object from coming into contact with the thermistor 14 accommodated in the protective portion 12. Incidentally, the "contact object" is an object that is prevented from coming into contact by the prevention portions 13, and is a concept including, for example, a user's finger, etc. A specific type or configuration of the prevention portions 13 is any type or any configuration, however, the prevention portions 13 are, for example, projections provided in the opening portions 122.

(Configuration—Detector—Thermistor)

The thermistor 14 of FIG. 4 is the aforementioned detection element. A specific type or configuration of the thermistor 14 is any type or any configuration, however, the thermistor 14 detects, for example, a temperature caused by heat or a hot air current, protrudes in a direction orthogonal to the direction in which the outer cover 11 is widened (Z-axis direction), and is accommodated in the protective portion 12.

(Configuration—Detector—Light Emitter)

The light emitter 15 of FIG. 4 is the aforementioned light emitter. A specific type or configuration of the light emitter 15 is any type or any configuration, however, for example, the light emitter 15 causes the light guide portions 111 and the protective portion 12 to emit light, outputs light toward the spectroscopic portion 123, and can be formed of a light emitting diode, etc.

(Emission of Light)

Figure 5:
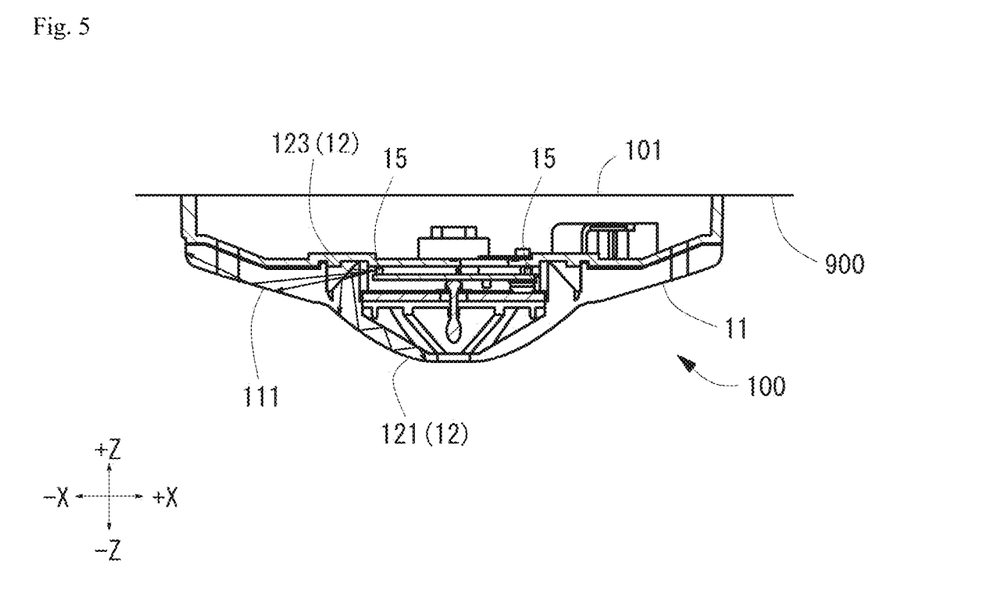
FIG. 5 is a view showing an optical path in FIG. 4 as an example.

Next, the emission of light by the detector 100 configured in such a manner will be described. Incidentally, the detector 100 emits light at any timing, and for example, any timing such as when a state of the detector 100 is notified or when the detector 100 determines a fire outbreak based on a temperature of heat detected by the thermistor 14 is assumed. Incidentally, since the same process as in the related art is applicable to a process in which the detector 100 determines a fire outbreak, the description thereof will not be repeated. FIG. 5 is a view showing an optical path in FIG. 4 as an example.

A control unit (not shown) of the detector 100 of FIG. 5 causes the light emitter 15 to output light. In this case, the light guide portions 111 and the protective portion 12 are integrally formed, and as shown in FIG. 5, the light from the light emitter 15 is refracted, dispersed, or reflected by the spectroscopic portion 123, and is guided to the entireties of the light guide portions 111 and the protective portion 12. Incidentally, in FIG. 5, for convenience of description, only an optical path of light from the light emitter 15 on the left side of the drawing sheet is shown, but in reality, light is also output from the light emitter 15 on the right side of the drawing sheet, and is guided to the entireties of the light guide portions 111 and the protective portion 12. Then, the entireties of the light guide portions 111 and the protective portion 12 of FIG. 1 emit the light. Since the light is emitted in such a manner, the light emitted from the detector 100 can be viewed from any position in a room in which the detector 100 is installed.

Effects of Embodiment

In such a manner, according to the present embodiment, visibility of a light emitting state can be improved, for example, by causing the protective portion 12 to emit light, the protective portion 12 protruding from the outer cover 11. Particularly, for example, a light emitting state can be viewed in any direction.

In addition, for example, since the entirety of the protective portion 12 can emit light by causing the protective portion 12 to guide the light from the light emitter 15 and to emit the light, visibility of a light emitting state can be improved.

In addition, for example, in addition to the protective portion 12, the light guide portions 111 can also emit light by causing the light guide portions 111 to emit light, so that visibility of a light emitting state can be further improved.

In addition, the light guide portions 111 extend from the front portion side of the outer cover 11 to the side portion side of the outer cover 11, so that a light emitting state can be reliably viewed even from, for example, a position which is away from the detector 100 and at which a front side is difficult to see. In addition, since the light emitting surfaces of the light guide portions 111 have a linear shape when viewed from the front portion side of the outer cover 11, for example, the design of the detector 100 can be improved.

In addition, the light guide portions 111 are provided at positions to correspond to the operation holes 112, so that the operation holes 112 can be less conspicuous, for example, by drawing a user's attention to the light guide portion 111 side.

Second Embodiment

Next, a second embodiment will be described. In this embodiment, the case where the detection element protector and the thin portion emit light will be described. Incidentally, unless other specified, each configuration of the second embodiment is assumed to be the same as each configuration having the same name in the first embodiment.
(Configuration—Detector)

Figure 6:
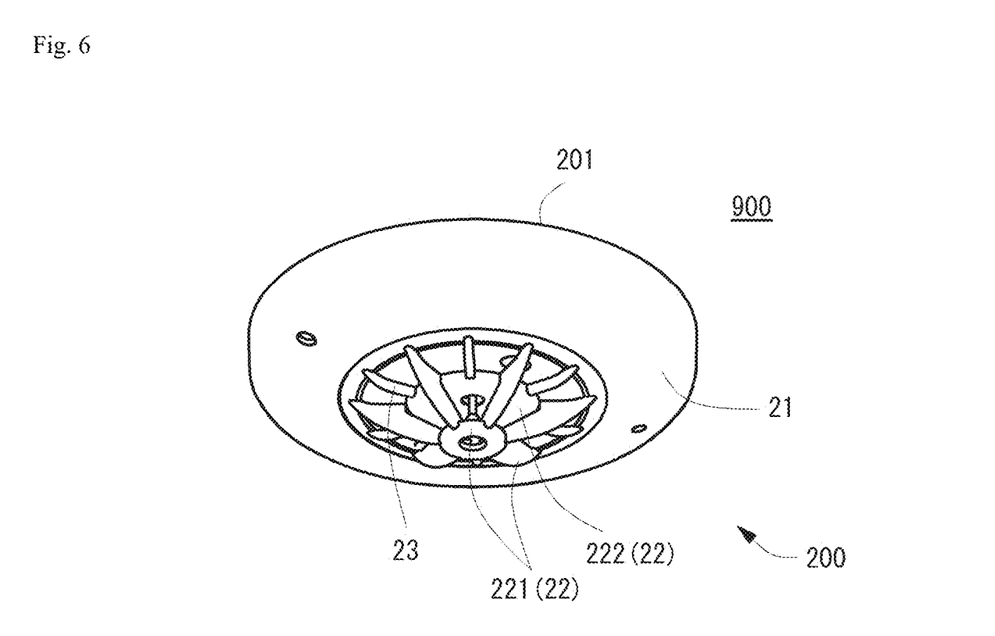
FIG. 6 is a perspective view of a detector according to a second embodiment.
Figure 7:
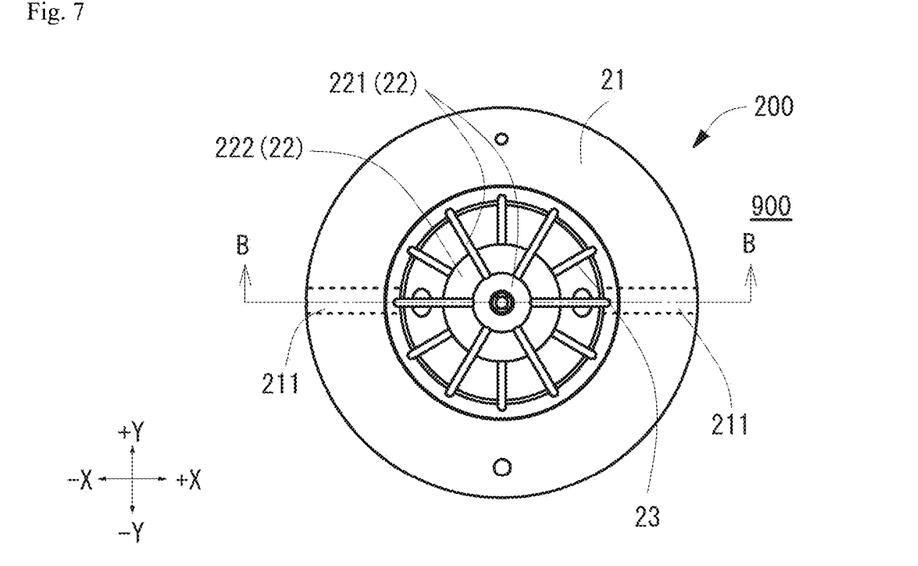
FIG. 7 is a plan view of the detector.
Figure 8:
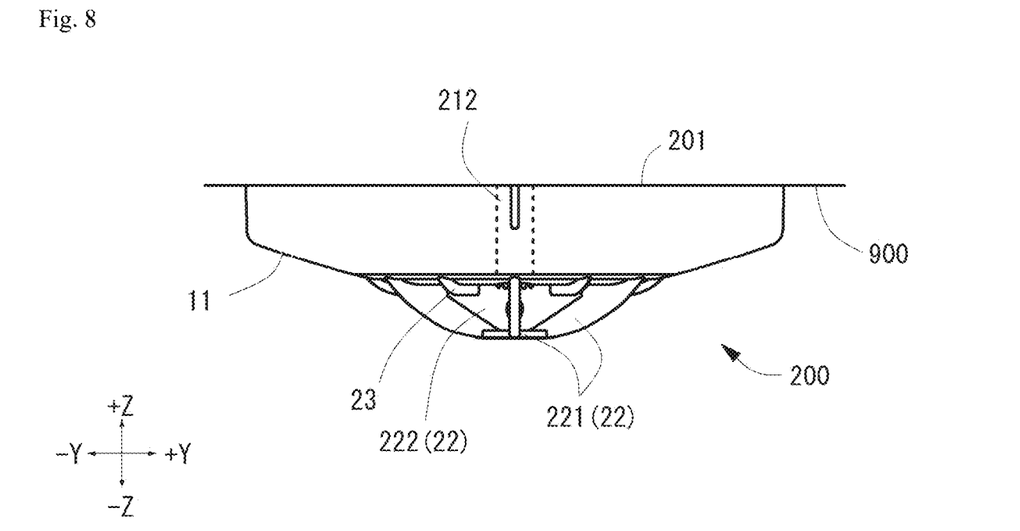
FIG. 8 is a side view of the detector.
Figure 9:
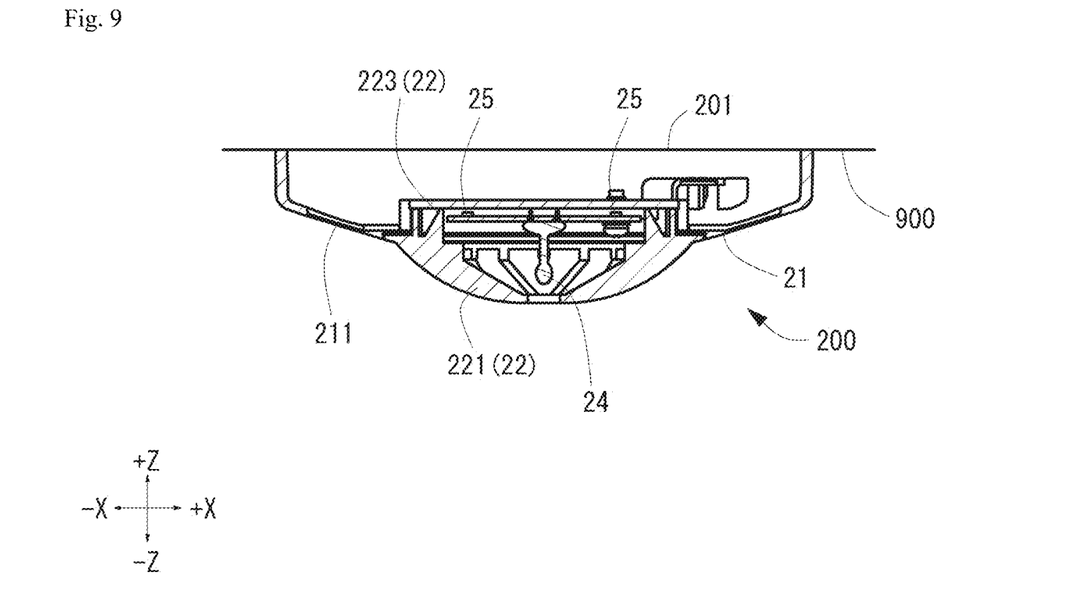
FIG. 9 is a cross-sectional view taken along line B-B of FIG. 7.

First, a configuration of a detector of the present embodiment will be described. FIG. 6 is a perspective view of the detector according to the embodiment of the invention, FIG. 7 is a plan view of the detector, FIG. 8 is a side view of the detector, and FIG. 9 is a cross-sectional view taken along line B-B of FIG. 7. A detector 200 of each drawing is a disaster prevention apparatus, specifically, is a heat detector that detects heat, is attached to, for example, an attachment object 900 that is a ceiling surface, through an attachment portion 201 of the detector 200 of FIG. 8, and as one example, includes an outer cover 21, a protective portion 22, and prevention portions 23 of FIG. 6, and a thermistor 24 and a light emitter 25 of FIG. 9.
(Configuration—Detector—Outer Cover)

The outer cover 21 of FIG. 6 covers at least some of components of the detector 200. A specific type or configuration of the outer cover 21 is any type or any configuration, however, for example, the outer cover 21 blocks all or only some of light, and includes thin portions 211 of FIG. 7.

The thin portions 211 are portions thinner than other portions of the outer cover 21. A specific type or configuration of the thin portions 211 is any type or any configuration, however, the thin portions 211 are, for example, portions thin enough to be able to transmit at least some of irradiation light (namely, portions thin enough to block only some of irradiation light), and are portions integrally formed with the other portions of the outer cover 21. Light emitting surfaces (surfaces exposed to the outside of the detector 200 of FIGS. 7 and 8, and corresponding to portions shown enclosed by dashed lines for convenience of description) of the thin portions 211 extend from a front portion side (−Z direction) of the outer cover 21 to a side portion side (+X direction or −X direction) of the outer cover 21, two thin portions 211 are provided, and as shown in FIG. 7, the light emitting surfaces of the thin portions 211 have a linear shape when viewed from the front portion side of the outer cover 21.

Incidentally, the "other portions of the outer cover 21" are a part of the outer cover 21, specifically, are portions of the outer cover 21 other than the thin portions 211, and for example, are portions thick enough to block substantially all irradiation light.
(Configuration—Detector—Protective Portion)

The protective portion 22 of FIG. 6 is the aforementioned detection element protector. A specific type or configuration of the protective portion 22 is any type or any configuration, however, for example, the protective portion 22 is formed in a part of the outer cover 21, is made of any material so as to function as a light guide that guides and emits light, is formed separately from the portions of the outer cover 21 having a light-shielding property, and allows light to pass through the outer cover 21 from the inside to the outside. In addition, the protective portion 22 protects, for example, the thermistor 24 of FIG. 9, and includes, for example, a frame portion 221 and opening portions 222 of FIG. 6, and a spectroscopic portion 223 of FIG. 9. Incidentally, since configurations of the frame portion 221, the opening portions 222, and the spectroscopic portion 223 are the same as the configurations of those having the same names in the first embodiment, the descriptions thereof will not be repeated.
(Configuration—Detector—Prevention Portion, Thermistor, Light Emitter)

Since configurations of the prevention portions 23 of FIG. 6 and the thermistor 24 and the light emitter 25 of FIG. 9 are the same as the configurations of those having the same names in the first embodiment, the descriptions thereof will not be repeated.
(Emission of Light)

Figure 10:
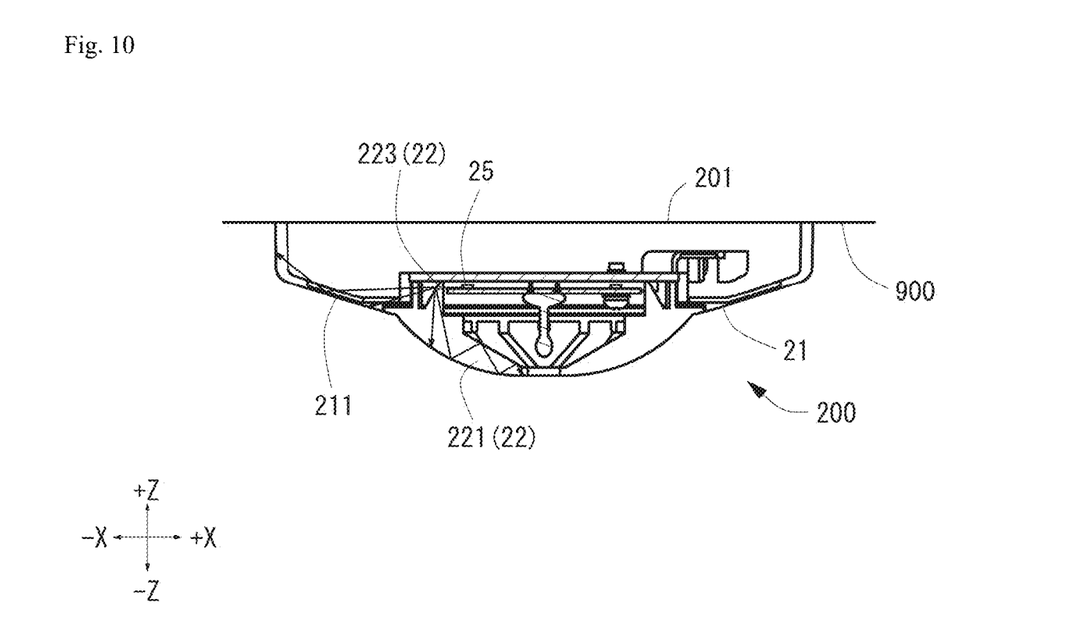
FIG. 10 is a view showing an optical path in FIG. 9 as an example.

Next, the emission of light by the detector 200 configured in such a manner will be described. FIG. 10 is a view showing an optical path in FIG. 9 as an example.

A control unit (not shown) of the detector 200 of FIG. 10 causes the light emitter 25 to output light. In this case, the light from the light emitter 25 is refracted, dispersed, or reflected by the spectroscopic portion 223, as shown in FIG. 10, the entirety of the thin portions 211 is irradiated with the light, and the light is guided to the entirety of the protective portion 22. Incidentally, in FIG. 10, for convenience of description, only an optical path of light from the light emitter 25 on the left side of the drawing sheet is shown, but in reality, light is also output from the light emitter 25 on the right side of the drawing sheet, the entirety of the thin portions 211 is irradiated with the light, and the light is guided to the entirety of the protective portion 22. Then, the entireties of the thin portions 211 and the protective portion 22 of FIG. 7 emit the light. Since the light is emitted in such a manner, the light emitted from the detector 200 can be viewed from any position in a room in which the detector 200 is installed.

Effects of Embodiment

In such a manner, according to the present embodiment, for example, since using other components such as a light guide is not required by causing the thin portions 211 to emit light, the number of components can be reduced, and the cost can be reduced.

In addition, the light emitting surfaces of the thin portions 211 extend from the front portion side of the outer cover 21 to the side portion side of the outer cover 21, so that a light emitting state can be reliably viewed even from, for example, a position which is away from the detector 200 and at which a front side is difficult to see. In addition, since the light emitting surfaces of the thin portions 211 have a linear shape when viewed from the front portion side of the outer cover 21, for example, the design of the detector 200 can be improved.

Modification Examples of Embodiments

The embodiments according to the invention have been described above, but the specific configurations, unit, and portions of the invention can be modified and improved in any manner within the scope of the technical concept of each invention in the appended claims. Hereinafter, such modification examples will be described.

Regarding Technical Problem and Effects of Invention

First, the technical problems and the effects of the invention are not limited to the above-described contents, and may differ depending on details of an implementation environment or configuration of the invention, and only some of the above-described problems may be solved, or only some of the above-described effects may be obtained.
(Regarding Segregation and Integration)

In addition, the above-described configurations are functionally conceptual, and do not necessarily need to be physically configured as shown in the drawings. Namely, the specific modes of the segregation and integration of the portions are not limited to those shown in the drawings, and all or some thereof can be configured to be functionally or physically segregated or integrated in any unit.
(Regarding Light Guide Portion and Thin Portion)

Figure 11:
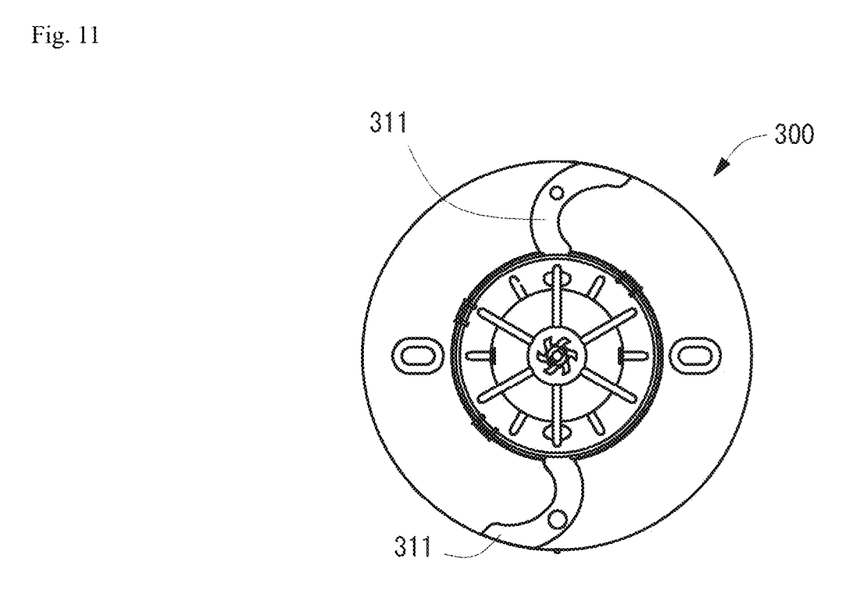
FIG. 11 is a plan view of the detector.

In addition, in the first embodiment, as shown in FIG. 2, the case in which the light emitting surfaces of the light guide portions 111 have a linear shape when viewed from the front portion side of the outer cover 21 has been described, but the invention is not limited thereto. FIG. 11 is a plan view of a detector. As in light guide portions 311 of a detector 300 of FIG. 11, light emitting surfaces (surfaces exposed to the outside of the detector 300 shown in FIG. 11) of the light guide portions 311 may have a curved shape (for example, an S shape as a whole) when viewed from the front portion side of the outer cover 21. In addition, similarly, the thin portions 211 of FIG. 7 in the second embodiment may also have a curved shape (for example, an S shape as a whole).

In addition, in the embodiments, the case where the two light guide portions and the two thin portions are provided has been described, but the invention is not limited thereto. For example, one light guide portion and one thin portion may be provided, or three or more light guide portions and three or more thin portions may be provided. Alternatively, the light guide portions and the thin portions may be omitted. In addition, the number or disposition of the light emitters corresponding to the protective portion, the light guide portions, and the thin portions is any number or any disposition.
(Regarding Light Emitting Target of Light Emitter)

In addition, in the embodiments, the case of causing the protective portion 12 of FIG. 2 and the protective portion 22 of FIG. 7 to emit light has been described, but the invention is not limited thereto. For example, only the light guide portions 111 of FIG. 2 and the thin portions 211 of FIG. 7 may be configured to emit light from the light emitters 15 and 25 by forming each of the protective portions 12 and 22 with a member having a light-shielding property.
(Regarding Application to Disaster Prevention Apparatuses of Various Shapes)

In addition, the techniques described in each embodiment or in the modification examples may be applied to various disaster prevention apparatuses. As one example, the techniques may be applied smoke detectors of various shapes. Specifically, the techniques may be applied to a smoke detector that accommodates a smoke detection unit in a part of an outer cover (hereinafter, a first smoke detector), or may be applied to a smoke detector in which the entirety of an outer cover has a disk shape and is flat, and which accommodates a smoke detection unit inside the outer cover that is flat without having a protrusion portion (hereinafter, a second smoke detector). In addition, in the case of applying the techniques to the first smoke detector, similarly to the case described in each embodiment, a protruding part may serve as the detection element protector to emit light, or a configuration may be employed in which a light guide portion or a thin portion is provided and the portion emits light. In addition, in the case of applying the techniques to the second smoke detector, since there is no protruding portion and a configuration corresponding to the detection element protector is not provided, a configuration may be employed in which only one of a light guide portion and a thin portion or both are provided and the light guide portion or the thin portion emits light. In addition, the concepts described herein may be applied to any disaster prevention apparatuses other than the smoke detector.

Regarding Features

In addition, the configurations of each embodiment and the features of the modification examples may be combined in any manner. For example, the detector 100 of FIG. 2 may be configured such that thin portions are provided in the outer cover 11 and the thin portions emit light together with the light guide portions 111, or the detector 200 of FIG. 7 may be configured such that light guide portions are provided in the outer cover 11 and the light guide portions emit light together with the thin portions 211. In this case as well, the disposition or number of both is any disposition or any number.

One embodiment of the present invention provides a disaster prevention apparatus comprises: an outer cover; and a light emitter that outputs information by causing at least a part of the disaster prevention apparatus to emit light, wherein the light emitter causes at least a detection element protector to emit the light, the detection element protector accommodating a detection element that detects a physical quantity of a detection target, and protruding from the outer cover.

According to this embodiment, visibility of a light emitting state can be improved, for example, by causing the detection element protector protruding from the outer cover to emit light. Particularly, for example, a light emitting state can be viewed in any direction.

Another embodiment of the present invention provides the disaster prevention apparatus according to the above embodiment, wherein the detection element protector guides the light from the light emitter, and emits the light.

According to this embodiment, since the entirety of the detection element protector can emit light by causing the detection element protector to guide the light from the light emitter and to emit the light, visibility of a light emitting state can be improved.

Another embodiment of the present invention provides the disaster prevention apparatus according to the above embodiment, further comprising: a light guide formed in at least a part of the outer cover, and the light emitter causes the light guide to emit the light.

According to this embodiment, for example, in addition to the detection element protector, the light guide can also emit light by causing light guide to emit light, so that visibility of a light emitting state can be further improved.

Another embodiment of the present invention provides the disaster prevention apparatus according to the above embodiment wherein a light emitting surface of the light guide extends from a front portion side of the outer cover to a side portion side of the outer cover, and the light emitting surface of the light guide has a linear shape or a curved shape when viewed from the front portion side of the outer cover.

According to this embodiment, the light emitting surfaces of the light guide extends from the front portion side of the outer cover to the side portion side of the outer cover, so that a light emitting state can be reliably viewed even from, for example, a position which is away from the disaster prevention apparatus and at which a front side is difficult to see. In addition, since the light emitting surfaces of the light guide have a linear shape or a curved shape when viewed from the front portion side of the outer cover, for example, the design of the disaster prevention apparatus can be improved. In particular, when the light emitting surfaces of the light guide have the curved shape when viewed from the front portion side of the outer cover, for example, when the disaster prevention apparatus is installed to the ceiling, the range in which the light guide can be seen from the floor side can be wider than when it is straight.

Another embodiment of the present invention provides the disaster prevention apparatus according to the above embodiment, wherein the light guide is provided at a position to correspond to an operation hole provided in the outer cover so as to operate the disaster prevention apparatus.

According to this embodiment, the light guide are provided at positions to correspond to the operation holes, so that the operation holes can be less conspicuous, for example, by drawing a user's attention to the light guide side.

Another embodiment of the present invention provides the disaster prevention apparatus according to the above embodiment, wherein the light emitter causes a thin portion to emit the light, the thin portion being a portion thinner than other portions of the outer cover.

According to this embodiment, for example, since using other components such as a light guide is not required by causing the thin portions to emit light, the number of components can be reduced, and the cost can be reduced.

Another embodiment of the present invention provides the disaster prevention apparatus according to the above embodiment, wherein a light emitting surface of the thin portion extends from a front portion side of the outer cover to a side portion side of the outer cover, and the light emitting surface of the thin portion has a linear shape or a curved shape when viewed from the front portion side of the outer cover.

According to this embodiment, the light emitting surfaces of the thin portions extend from the front portion side of the outer cover to the side portion side of the outer cover, so that a light emitting state can be reliably viewed even from, for example, a position which is away from the disaster prevention apparatus and at which a front side is difficult to see. In addition, since the light emitting surfaces of the thin portions have a linear shape or a curved shape when viewed from the front portion side of the outer cover, for example, the design of the disaster prevention apparatus can be improved. In particular, when the light emitting surfaces of the thin portions have the curved shape when viewed from the front portion side of the outer cover, for example, when the disaster prevention apparatus is installed to the ceiling, the range in which the light guide can be seen from the floor side can be wider than when it is straight, and when multiple disaster prevention apparatus are installed, the impression of unevenly oriented light-emitting surfaces can be mitigated.

Another embodiment of the present invention provides the disaster prevention apparatus according to the above embodiment, wherein the disaster prevention apparatus is at least a heat detector, and the detection element protector is at least a thermistor guard.

According to this embodiment, since the disaster prevention apparatus is at least a heat detector, which makes it possible, for example, to provide a heat detector that can make the luminous state visible from all directions.

One embodiment of the present invention provides a disaster prevention apparatus comprises: an outer cover; and a light emitter that outputs information by causing at least a part of the disaster prevention apparatus to emit light, wherein the light emitter causes at least a light guide to emit the light, the light guide being formed in at least a part of the outer cover, and a light emitting surface of the light guide extends from a front portion side of the outer cover to a side portion side of the outer cover.

According to this embodiment, for example, visibility of a light emitting state can be further improved by causing the light guide to emit light. In addition, the light emitting surfaces of the light guide extends from the front portion side of the outer cover to the side portion side of the outer cover, so that a light emitting state can be reliably viewed even from, for example, a position which is away from the disaster prevention apparatus and at which a front side is difficult to see.

Another embodiment of the present invention provides the disaster prevention apparatus according to the above embodiment, wherein the light emitting surface of the light guide has a linear shape or a curved shape when viewed from the front portion side of the outer cover.

According to this embodiment, since the light emitting surfaces of the light guide have a linear shape or a curved shape when viewed from the front portion side of the outer cover, for example, the design of the disaster prevention apparatus can be improved. In particular, when the light emitting surfaces of the light guide have the curved shape when viewed from the front portion side of the outer cover, for example, when the disaster prevention apparatus is installed to the ceiling, the range in which the light guide can be seen from the floor side can be wider than when it is straight, and when multiple disaster prevention apparatus are installed, the impression of unevenly oriented light-emitting surfaces can be mitigated.

One embodiment of the present invention provides a disaster prevention apparatus comprises: an outer cover; and a light emitter that outputs information by causing at least a part of the disaster prevention apparatus to emit light, wherein the light emitter causes at least a thin portion to emit the light, the thin portion being a portion thinner than other portions of the outer cover, and a light emitting surface of the thin portion extends from a front portion side of the outer cover to a side portion side of the outer cover.

According to this embodiment, for example, visibility of a light emitting state can be further improved by causing the thin portions to emit light. In addition, for example, since using other components such as a light guide is not required, the number of components can be reduced, and the cost can be reduced. In addition, the light emitting surfaces of the thin portions extends from the front portion side of the outer cover to the side portion side of the outer cover, so that a light emitting state can be reliably viewed even from, for example, a position which is away from the disaster prevention apparatus and at which a front side is difficult to see.

Another embodiment of the present invention provides the disaster prevention apparatus according to the above embodiment, wherein a light emitting surface of the thin portion has a linear shape or a curved shape when viewed from the front portion side of the outer cover.

According to this embodiment, since the light emitting surfaces of the thin portions have a linear shape or a curved shape when viewed from the front portion side of the outer cover, for example, the design of the disaster prevention apparatus can be improved. In particular, when the light emitting surfaces of the thin portions have the curved shape when viewed from the front portion side of the outer cover, for example, when the disaster prevention apparatus is installed to the ceiling, the range in which the light guide can be seen from the floor side can be wider than when it is straight, and when multiple disaster prevention apparatus are installed, the impression of unevenly oriented thin portions can be mitigated.

REFERENCE SIGNS LIST

11: outer cover
12: protective portion
13: prevention portion
14: thermistor
15: light emitter
21: outer cover
22: protective portion
23: prevention portion
24: thermistor
25: light emitter
100: detector
101: attachment portion
111: light guide portion
112: operation hole
121: frame portion
122: opening portion
123: spectroscopic portion
200: detector
201: attachment portion
211: thin portion
221: frame portion
222: opening portion
223: spectroscopic portion
300: detector
311: light guide portion
900: attachment object

The invention claimed is:

1. A disaster prevention apparatus installed at a monitoring region comprising:
an outer cover;
a light emitter that outputs information by causing at least a part of the disaster prevention apparatus to emit light; and
a detection element protector that accommodates a detection element to detect a fire outbreak or a gas leakage in the monitoring region, and that the detection element protector protrudes from the outer cover and is exposed outside of the disaster prevention apparatus; and
wherein the outer cover comprises:
a thick portion that is thick enough to block substantially all irradiation light and
a thin portion that is thin enough to be able to transmit at least some of the irradiated light and is thinner than the thick portion of the outer cover;
a thin portion that is a portion thinner than other portions of the outer cover,
wherein the detection element protector has a spectroscopic portion that allows light from the light emitter to enter the detection element protector and the thin portion so that the light from the light emitter is split by the spectroscopic portion and entered to both of the detection element protector and the thin portion and viewed from outside of the outer cover through both of the detection element protector and the thin portion.

2. The disaster prevention apparatus according to claim 1, wherein a light emitting surface of the thin portion extends from a front portion side of the outer cover to a side portion side of the outer cover, and the light emitting surface of the thin portion has a linear shape or a curved shape when viewed from the front portion side of the outer cover.

3. The disaster prevention apparatus according to claim 1, wherein the thin portion is provided at a position to correspond to an operation hole provided in the outer cover for inserting a jig to operate the disaster prevention apparatus.

4. The disaster prevention apparatus according to claim 1, wherein the disaster prevention apparatus is at least a heat detector, and the detection element protector is at least a thermistor guard.

5. The disaster prevention apparatus according to claim 1, wherein an outer surface of the thick portion and an outer surface of the thin portion are flush with each other and form an outer surface of the outer cover.

6. The disaster prevention apparatus according to claim 1, wherein the outer cover has a light guide that guide and emit light, the light guide protrudes from the outer cover and is exposed outside of the disaster prevention apparatus, and
wherein the spectroscopic portion allows light from the light emitter to enter the detection element protector, the thin portion, and the light guide so that the light from the light emitter is split by the spectroscopic portion and entered to each of the detection element protector, the thin portion, and the light guide and viewed from outside of the outer cover through each of the detection element protector, the thin portion, and the light guide.

* * * * *